United States Patent
Hirota et al.

(10) Patent No.: US 6,966,365 B2
(45) Date of Patent: Nov. 22, 2005

(54) OUTFLOW PREVENTION DEVICE

(75) Inventors: Hisatoshi Hirota, Tokyo (JP); Tokumi Tsugawa, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 250 days.

(21) Appl. No.: 10/428,107

(22) Filed: May 2, 2003

(65) Prior Publication Data

US 2003/0213516 A1 Nov. 20, 2003

(30) Foreign Application Priority Data

May 20, 2002 (JP) .............................. 2002-144334

(51) Int. Cl.[7] .............................................. F16K 17/20
(52) U.S. Cl. ..................... 165/286; 62/197; 137/115.5; 137/599.14
(58) Field of Search ...................... 137/115.05, 599.14; 165/286; 62/197

(56) References Cited

U.S. PATENT DOCUMENTS

| | | | | |
|---|---|---|---|---|
| 2,509,504 A | * | 5/1950 | Jensen .................... | 137/115.21 |
| 3,196,630 A | * | 7/1965 | Barbier ........................ | 62/197 |
| 5,271,559 A | | 12/1993 | Naujock ................ | 237/12.3 B |
| 6,000,421 A | * | 12/1999 | Huemer et al. ............. | 137/110 |
| 6,076,366 A | * | 6/2000 | Takano et al. ............. | 62/196.4 |

FOREIGN PATENT DOCUMENTS

| | | |
|---|---|---|
| EP | 0 417 172 | 3/1991 |
| EP | 0 923 458 | 6/1999 |

* cited by examiner

Primary Examiner—Stephen M. Hepperle
(74) Attorney, Agent, or Firm—Westerman, Hattori, Daniels & Adrian, LLP.

(57) ABSTRACT

To provide an outflow prevention device which is capable of preventing refrigerant from flowing out into a vehicle compartment even when an evaporator has ruptured.

The outflow prevention device comprises a shut valve arranged in a passage via which refrigerant introduced into a shut valve inlet from an expansion device is allowed to flow to the evaporator, and a check valve arranged in a passage via which refrigerant returned from the evaporator is allowed to flow to an accumulator. A chamber behind a piston fixed to a plug holding a valve sheet and a chamber on a downstream side of the check valve are communicated with each other via a bypass passage, so that differential pressure generated across the check valve by flow of refrigerant through the same can be applied to the shut valve to open and close the same. The valve sheet and the piston are formed to have the same diameters so as to prevent the shut valve from being influenced by introduced pressure, thereby enabling the shut valve to be operated only by the differential pressure generated across the check valve.

13 Claims, 9 Drawing Sheets

OUTFLOW PREVENTION DEVICE

CROSS-REFERENCES TO RELATED APPLICATIONS, IF ANY

This application claims priority of Japanese Application No.2002-144334 filed on May 20, 2002 and entitled "Outflow Prevention Device".

BACKGROUND OF THE INVENTION (1) Field of the Invention

This invention relates to an outflow prevention device, and more particularly to an outflow prevention device for preventing a refrigerant within an automotive air conditioner from flowing out into a vehicle compartment.

(2) Description of the Related Art

In automotive air conditioners, CFC-based refrigerants are used as refrigerant for a refrigeration cycle. However, in view of a global environmental problem that chlorofluorocarbons destroy the ozone layer, causing danger of ultraviolet rays harmful to human health radiating through ozone holes onto an earth surface, CFC substitutes as refrigerants are being studied.

In recent years, a refrigeration cycle using carbon dioxide as a refrigerant has been drawing attention. The refrigeration cycle using carbon dioxide is basically constituted by devices similar to ones used in a refrigeration cycle using a CFC refrigerant.

More specifically, a refrigeration cycle is comprised of a compressor for pressurizing refrigerant up to a supercritical region, a gas cooler for cooling the pressurized refrigerant by heat exchange with the outside air, an expansion device for depressurizing the refrigerant delivered from the gas cooler, and an evaporator for evaporating the depressurized refrigerant by heat exchange with air in a vehicle compartment. Further, in the refrigeration cycle using carbon dioxide as a refrigerant, at respective locations downstream of the evaporator, there are arranged an accumulator for storing excess refrigerant, and an internal heat exchanger for cooling the refrigerant cooled by the gas cooler, by refrigerant being sent to the compressor from the accumulator.

The compressor, the gas cooler, the expansion device, the accumulator, and the internal heat exchanger, which form the refrigeration cycle, are arranged in an engine room, while the evaporator is arranged in the vehicle compartment. During cooling operation, when refrigerant having become a low-temperature refrigerant by being depressurized in the expansion device is supplied to the evaporator, the evaporator exchanges heat with the air in the vehicle compartment to thereby cool the air.

In the refrigeration cycle using carbon dioxide as a refrigerant, pressure is much higher than in a refrigeration cycle using a CFC-based refrigerant, and hence component parts used therein are highly pressure-resistant.

However, in the evaporator arranged as a heat exchanger in the vehicle compartment, rupture or outflow can occur despite of the highly pressure-resistant design of the evaporator. If carbon dioxide flows out into the vehicle compartment, an oxygen deficiency occurs in the vehicle compartment, which can do harm to passengers.

SUMMARY OF THE INVENTION

The present invention has been made in view of the above circumstances, and an object thereof is to provide an outflow prevention device which is capable of preventing refrigerant from flowing out into a vehicle compartment even when a heat exchanger provided in the vehicle compartment has ruptured.

To solve the above problem, the present invention provides an outflow prevention device for preventing outflow of fluid flowing through a heat exchanger due to breakage of the heat exchanger, characterized by comprising a check valve arranged on a fluid outlet side of the heat exchanger, for allowing the fluid to flow only in a direction in which the fluid flows out from the heat exchanger, and a shut valve arranged on a fluid inlet side of the heat exchanger, for opening and closing in a manner interlocked with opening and closing operations of the check valve, to thereby control flow of the fluid flowing into the heat exchanger.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described in detail with reference to drawings, by taking, as an example, a case of the present invention being applied to a refrigeration cycle of an automotive air conditioning system.

Figure 1:
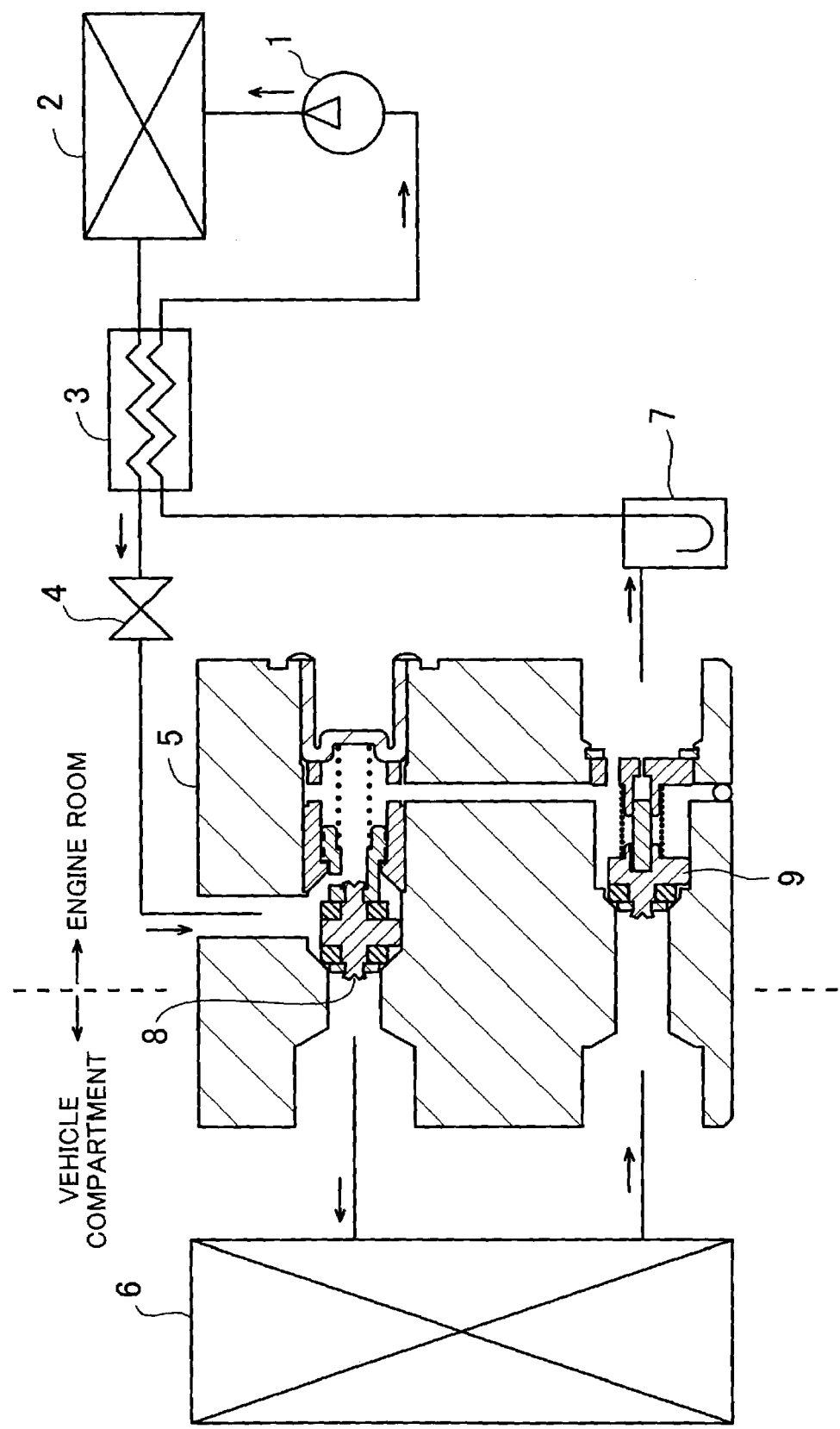
FIG. 1 is a system diagram showing a refrigeration cycle to which is applied an outflow prevention device of the present invention.

FIG. 1 is a system diagram showing the refrigeration cycle to which is applied an outflow prevention device of the present invention.

The refrigeration cycle is comprised of a compressor 1 for compressing refrigerant of carbon dioxide, a gas cooler 2 for cooling the high-temperature and high-pressure refrigerant compressed by the compressor 1, an internal heat exchanger 3, an expansion device 4 for reducing the pressure of the cooled high-temperature and high-pressure refrigerant to thereby change the refrigerant into a low-temperature and low-pressure refrigerant, an outflow prevention device 5 for preventing outflow of refrigerant, an evaporator 6 for evaporating the low-temperature and low-pressure refrigerant, and an accumulator 7 for storing excess refrigerant. The outflow prevention device 5 has a shut valve 8 arranged between the expansion device 4 and the evaporator 6 and a check valve 9 arranged between the evaporator 6 and the accumulator 7 to cause refrigerant to flow only in a direction from the evaporator 6 toward the accumulator 7. The shut valve 8 is opened and closed by utilizing differential pressure generated between an inlet of the check valve 9 and an outlet of the same by a flow of refrigerant through the check valve 9. The compressor 1, the gas cooler 2, the internal heat exchanger 3, the expansion device 4, and the accumulator 7 are arranged within an engine room, while the evaporator 6 is arranged within a vehicle compartment.

When normal refrigeration is being performed by the refrigeration cycle arranged as above, the shut valve 8 and the check valve 9 of the outflow prevention device 5 are each open. During the normal refrigeration, the high-temperature and high-pressure refrigerant compressed by the compressor 1 is cooled by the gas cooler 2 and the internal heat exchanger 3, and then adiabatically expanded by the expansion device 4 into the low-temperature and low-pressure refrigerant to be supplied to the evaporator 6 via the shut valve 8 of the outflow prevention device 5. The refrigerant supplied to the evaporator 6 is evaporated therein by heat exchange with air in the vehicle compartment, and then flows into the accumulator 7 via the check valve 9 of the outflow prevention device 5 to be separated into gas and liquid. The gaseous refrigerant separated from the liquid refrigerant by the accumulator 7 undergoes heat exchange with refrigerant flowing out from the gas cooler 2, in the internal heat exchanger 3, followed by returning to the compressor 1.

Now, let it be assumed that the evaporator 6 has ruptured during normal refrigeration by the refrigeration cycle, to form a hole somewhere in the evaporator 6. In this case, the evaporator 6 side of the outflow prevention device 5 is made open to the atmosphere, and hence pressure on the evaporator 6 side of the check valve 9 becomes low, whereby the check valve 9 is closed. Simultaneously with this, the shut valve 8 which operates in a manner interlocked with the check valve 9 is also closed. Thus, the refrigerant of carbon dioxide is prevented from flowing out from the broken evaporator 6 into the vehicle compartment.

Next, an outflow prevention device 5 according to each embodiment will be described in detail.

Figure 2:
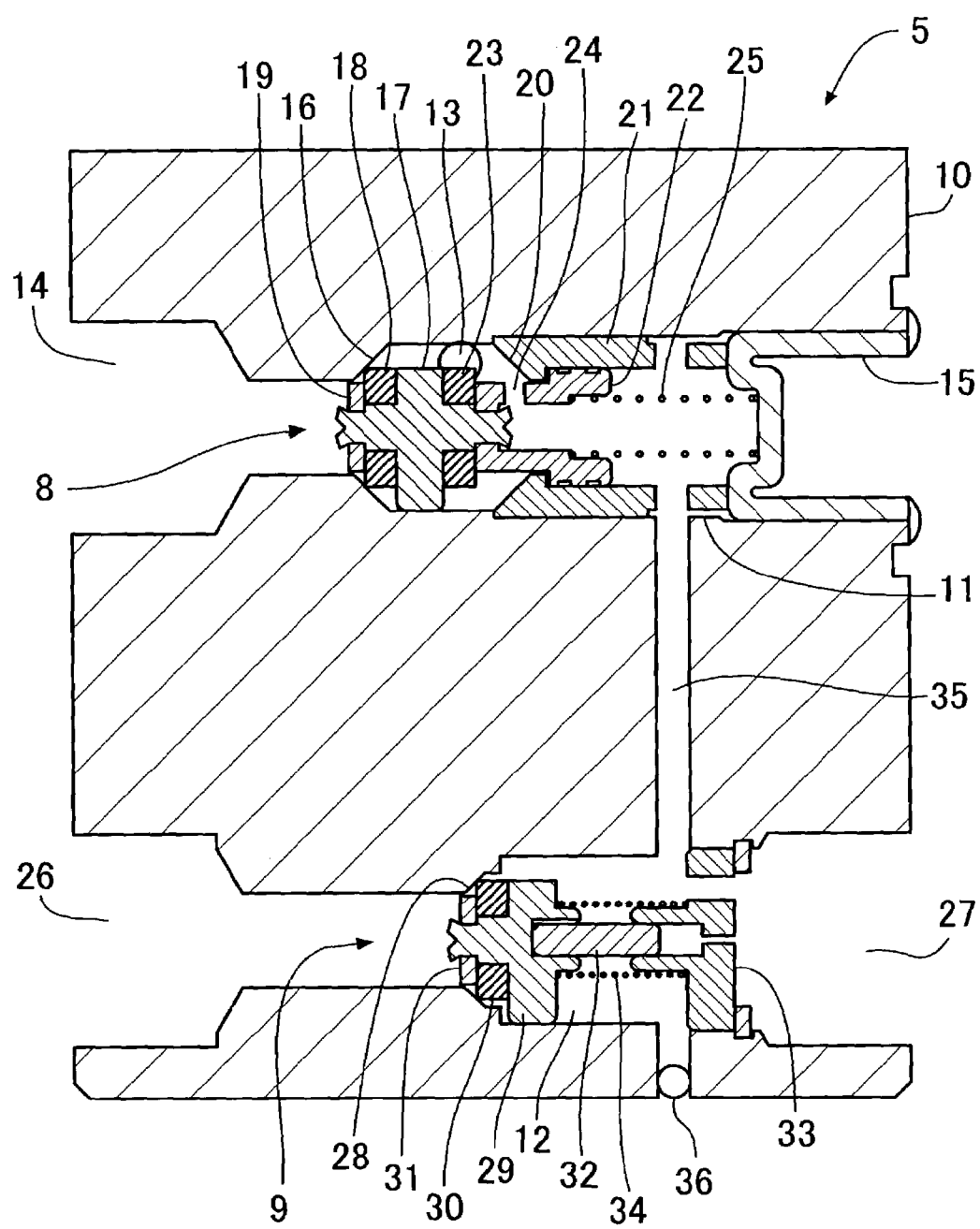
FIG. 2 is a horizontal cross-sectional view showing the construction of an outflow prevention device according to a first embodiment, in a valve-closed state.
Figure 3:
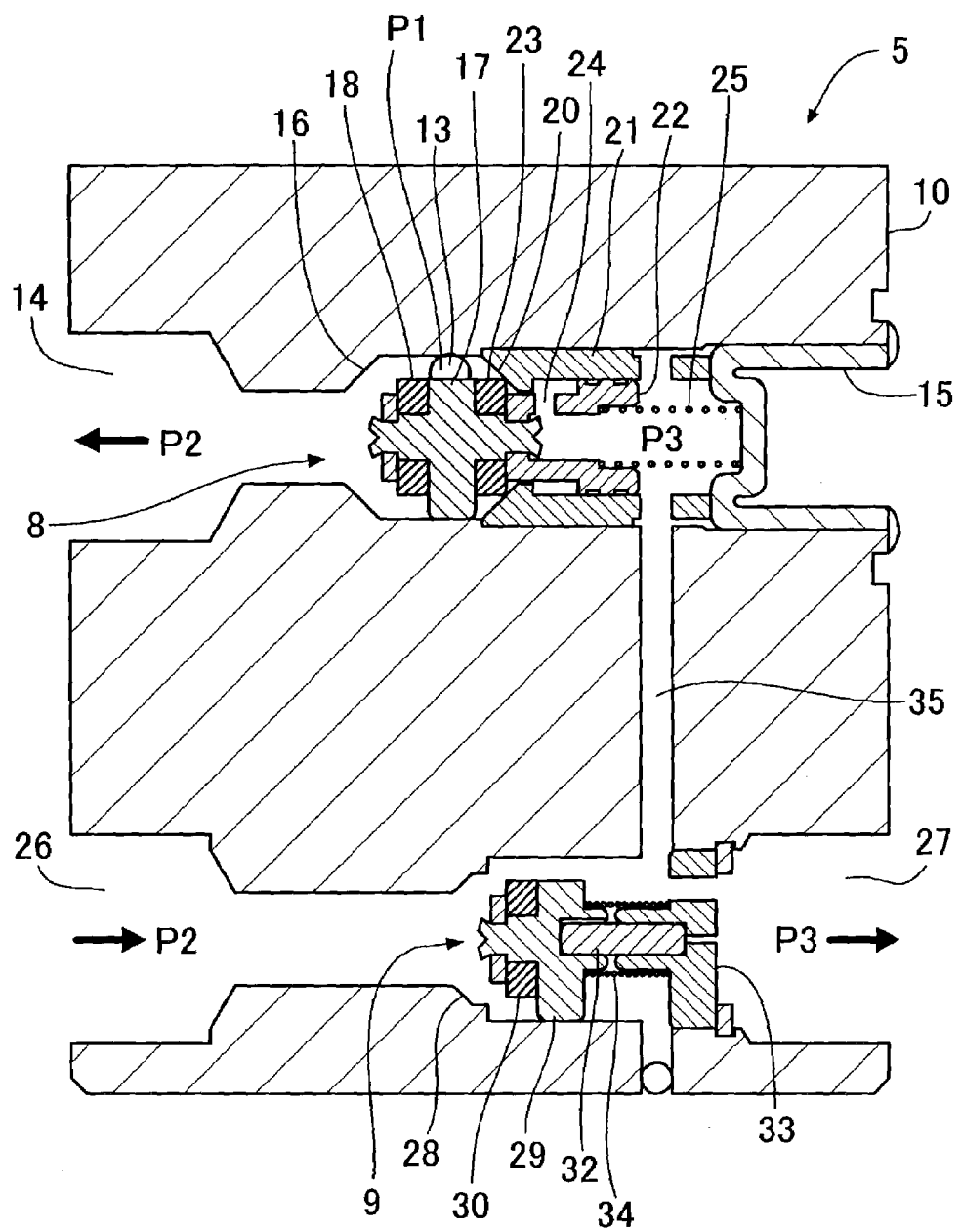
FIG. 3 is a horizontal cross-sectional view showing the construction of the outflow prevention device according to the first embodiment, in a valve-open state.

FIG. 2 is a horizontal cross-sectional view showing an outflow prevention device 5 according to a first embodiment in its valve-closed state, while FIG. 3 is a horizontal cross-sectional view showing the outflow prevention device 5 according to the first embodiment in its valve-open state.

The outflow prevention device 5 of the first embodiment has a body 10 formed with an upper passage 11 and a lower passage 12 extending horizontally therethrough in parallel with each other. A shut valve 8 is arranged in the upper passage 11, while a check valve 9 is arranged in the lower passage 12. Into the upper passage 11 opens a shut valve inlet 13 for supply of refrigerant from the expansion device 4 into the upper passage 11. On a left end side of the upper passage 11, as viewed in the figure, a shut valve outlet 14 is formed for connection to a pipe leading to the evaporator 6, and a right open end of the upper passage 11, as viewed in the figure, is closed by a cap 15.

Between the shut valve inlet 13 and the shut valve outlet 14, a tapered valve seat 16 is integrally formed with the body 10. A plug 17 is disposed in a manner opposed to the valve seat 16 from the upstream side such that the plug 17 can move to and away from the valve seat 16. A valve sheet 18 as a component of a valve element is fixed to a side of the plug 17 opposed to the valve seat 16, via a washer 19, by being crimped to an end face of the plug 17. The valve sheet 18 is made of a pliant material which ensures that an excellent sealing property can be obtained when the valve sheet 18 is seated on the valve seat 16, and preferably made of polytetrafluoroethylene.

Further, a guide 21 having a valve seat 20 at a plug 17-side end face thereof is inserted in the upper passage 11. A piston 22 is arranged in the guide 21 such that the piston 22 can axially move forward or backward. The piston 22 has one end thereof fixed to an end face of the plug 17 by crimping. The piston 22 has the same diameter as that of the valve sheet 18, and a closed-state pressure-receiving area on which the pressure acts when a passage to the evaporator 6 is closed by the shut valve 8 and a piston pressure-receiving area are set to be equal to each other. Since the pressure-receiving area of the valve sheet 18 and that of the piston 22 are equal to each other, the pressure of refrigerant supplied to the outflow prevention device is canceled out, which enables the shut valve 8 to open and close irrespective of the value of the pressure of the refrigerant.

Further, a valve sheet 23 as a component of the valve element opposed to the valve seat 20 is fixed to the plug 17. The valve sheet 23 is made e.g. of polytetrafluoroethylene. The piston 22 has a side face thereof formed with a bleed hole 24 for communication with a chamber behind the piston 22 via a central hole of the piston 22. Arranged between the piston 22 and the cap 15 is a spring 25 for urging the valve sheet 18 in a direction causing the valve sheet 18 to be seated on the valve seat 16.

The lower passage 12 has a left end portion thereof, as viewed in the figure, formed with a check valve inlet 26 for connection to a pipe leading to the evaporator 6, and a right end thereof, as viewed in the figure, formed with a check valve outlet 27. In an intermediate portion of the lower passage 12, a tapered valve seat 28 is integrally formed with the body 10. A plug 29 is disposed in a manner opposed to the valve seat 28 from the downstream side such that the plug 29 can move to and away from the valve seat 28. A valve sheet 30 as a component of a valve element is fixed to a side of the plug 29 opposed to the valve seat 28, via a washer 31, by being crimped to an end face of the plug 29. The valve sheet 30 is made e.g. of polytetrafluoroethylene. A shaft 32 is provided downstream of the plug 29, and the shaft 32 is held by a guide 33 such that the plug 29 can axially move forward and backward. Between the plug 29 and the guide 33, there is arranged a spring 34 for urging the check valve 9 in the valve-closing direction. A chamber downstream of the check valve 9 is in communication with the chamber behind the piston 22 of the shut valve 8 via a bypass passage 35. An end of a hole formed through the body 10 when the bypass passage 35 is bored is closed by press-fitting a stopper 36 therein.

When the pressure of refrigerant introduced into the shut valve 8 is represented by P1, the pressure of refrigerant on the evaporator 6 side of the shut valve 8 and the check valve 9 by P2 (assuming that there is no pressure loss in the evaporator 6 at the worst), the pressure of refrigerant guided out from the check valve 9 by P3, a valve-opening differential pressure set point at which the check valve 9 starts to open by $\Delta$Pa, and a valve-opening differential pressure set point at which the shut valve 8 starts to open by ΔPb, the check valve 9 is opened when P2−P3>ΔPa holds, and the shut valve 8 is also opened when P2−P3>ΔPb holds. However, so as to ensure that the shut valve 8 is positively opened when the check valve 9 is opened, ΔPa is set to be equal to or larger than ΔPb (ΔPa>=ΔPb). Further, the valve-opening differential pressure set points ΔPa, ΔPb are set by respective loads of the spring 34 of the check valve 9 and the spring 25 of the shut valve 8.

Next, the operation of the outflow prevention device constructed as above will be described. In the shut valve 8, the pressure-receiving area of the valve sheet 18 and that of the piston 22 are set to be equal to each other, and hence the shut valve 8 is not influenced by the pressure P1 of the refrigerant supplied from the expansion device 4, but opened and closed by the differential pressure P2−P3 between the pressure P2 on the evaporator 6 side of the shut valve 8 and the pressure P3 within the chamber behind the piston 22 of the same (i.e. pressure on the downstream side of the check valve 9). The differential pressure P2−P3 as motive power for moving the shut valve 8 is generated by the check valve 9.

More specifically, since the check valve 9 is urged by the spring 34 in the valve-closing direction, when refrigerant is sucked by the compressor 1 to flow from the evaporator 6, through the check valve 9, toward the accumulator 7, the pressure P3 on the downstream side of the check valve 9 becomes lower than the pressure P2 on the upstream side of the same, whereby the differential pressure P2−P3 is generated across the check valve 9. The pressure P2 on the upstream side of the check valve 9 is equal to the pressure on the downstream side of the shut valve 8, and the pressure P3 on the downstream side of the check valve 9 is also applied to the chamber behind the piston 22 of the shut valve 8 via the bypass passage 35, which means that the same differential pressure P2−P3 as the differential pressure P2−P3 across the check valve 9 is applied to the shut valve 8. Therefore, the shut valve 8 receives the same differential pressure P2−P3 as the differential pressure P2−P3 across the check valve 9 to be moved rightward as viewed in FIG. 3, and as shown in this figure, the shut valve 8 and the check valve 9 are each held in the open state. As described above, when the refrigeration cycle is performing normal refrigeration to maintain a normal flow of refrigerant, the differential pressure is spontaneously generated across the check valve 9, and the shut valve 8 senses the same differential pressure, whereby the shut valve 8 is held in the valve-open state as well as the check valve 9.

If the evaporator 6 ruptures when the refrigeration cycle is in the normal operating condition as described above, refrigerant within the system escapes from the ruptured portion of the evaporator 6, which causes reduction of pressure within the evaporator 6. At this time, although the compressor 1 is performing sucking operation, a pressure e.g. of approximately 30 bars is applied to the downstream side of the check valve 9. On the other hand, the upstream side of the check valve 9 is made open to the atmosphere, which makes the pressure on the downstream side higher than that on the upstream side. Accordingly, when the check valve 9 is made open to the atmosphere due to the rupture of the evaporator 6, the check valve 9 is immediately closed, and the shut valve 8 is also closed in a manner interlocked with the operation of the check valve 9. Thus, the check valve 9 and the shut valve 8 are each held in the valve-closed state as shown in FIG. 2, whereby it is possible to prevent refrigerant from flowing out from the upstream side of the outflow prevention device 5 into the evaporator 6.

When the shut valve 8 and the check valve 9 of the outflow prevention device 5 are fully closed due to the rupture of the evaporator 6, reduction of the refrigerant pressure is sensed e.g. by a pressure sensor arranged on the evaporator 6 side, and the operation of the refrigeration cycle is stopped. However, even if the compressor 1 continues rotating, a flow of refrigerant cannot be interrupted by the outflow prevention device 5, so that it is possible to prevent the pressure within the refrigeration cycle from becoming abnormally high. More specifically, when the shut valve 8 is closed, the bleed hole 24 formed in the piston 22 appears in a chamber communicating with the shut valve inlet 13, whereby a refrigerant passage is formed for allowing refrigerant supplied from the expansion device 4 to flow from the shut valve inlet 13 into the chamber behind the piston 22 via the bleed hole 24 and the central hole formed in the piston 22, and then further flow into the chamber downstream of the check valve 9 via the bypass passage 35. Thus, since the passage bypassing the evaporator 6 is formed when the shut valve 8 and the check valve 9 of the outflow prevention device 5 are fully closed, it is possible to prevent the pressure within the refrigeration cycle from becoming abnormally high.

Figure 4:
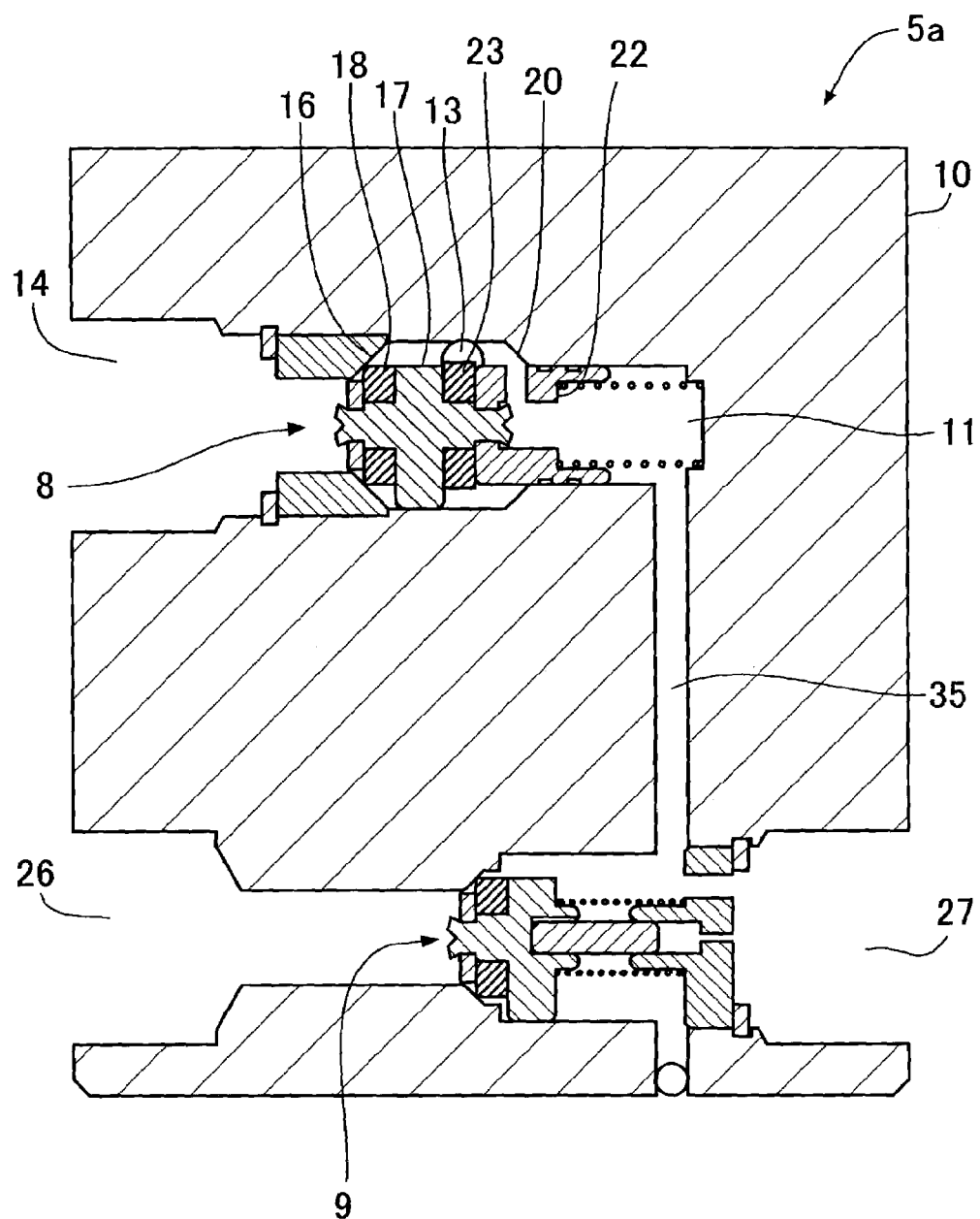
FIG. 4 is a horizontal cross-sectional view showing the construction of an outflow prevention device according to a second embodiment, in a valve-closed state.
Figure 5:
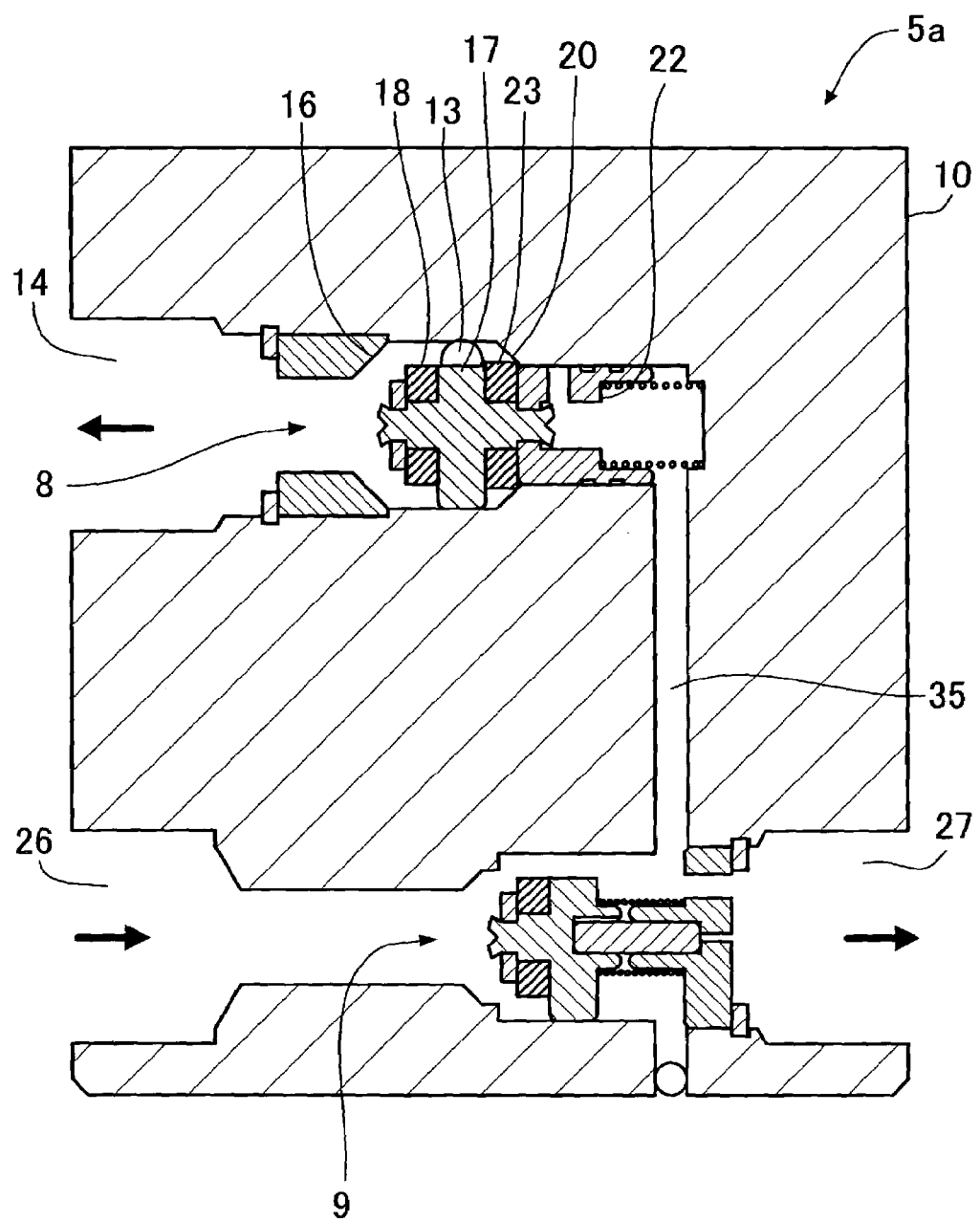
FIG. 5 is a horizontal cross-sectional view showing the construction of the outflow prevention device according to the second embodiment, in a valve-open state.

FIG. 4 is a horizontal cross-sectional view showing an outflow prevention device according to a second embodiment in its valve-closed state, while FIG. 5 is a horizontal cross-sectional view showing the same in its valve-open state. In FIGS. 4 and 5, component parts and elements similar or equivalent to those shown in FIGS. 2 and 3 are designated by identical reference numerals, and detailed description thereof is omitted.

In the outflow prevention device 5a according to the second embodiment, an upper passage 11 formed in a body 10 for a shut valve 8 does not extend through the body 10. In this construction, a valve seat 16 corresponding to a valve sheet 18 fixed to a plug 17 is formed by a component part separate from the body 10 and fitted in the upper passage 11, while a valve seat 20 corresponding to a valve sheet 23 is integrally formed with the body 10. The valve sheet 18 has the same diameter as that of a piston 22, and a closed-state pressure-receiving area of the shut valve 8 and a piston pressure-receiving area of the same are set to be equal to each other. However, the valve sheet 23 arranged on a piston 22 side is formed to have a larger diameter than that of the valve sheet 18 so as to be seated on a tapered portion of the valve seat 20, i.e. to have a large seal diameter. A check valve 9 is constructed similarly to that of the outflow prevention device 5 according to the first embodiment.

In the outflow prevention device 5a constructed as above, the operation thereof is similar to that of the outflow prevention device 5 of the first embodiment. More specifically, when the compressor 1 is started to suck refrigerant on a downstream side of the check valve 9, the check valve 9 is opened, and refrigerant starts flowing through the check valve 9. This produces differential pressure across the check valve 9, which causes the shut valve 8 to open as shown in FIG. 5, whereby refrigerant is circulated within the refrigerating cycle. On the other hand, if refrigerant flows out into the vehicle compartment due to rupture of the evaporator 6, pressure on the upstream side of the check valve 9 becomes lower than pressure on the downstream side of the same. As a result, the check valve 9 is closed, and differential pressure generated across the check valve 9 causes the shut valve 8 to close as shown in FIG. 4, whereby refrigerant is prevented from flowing out from the evaporator 6.

Figure 6:
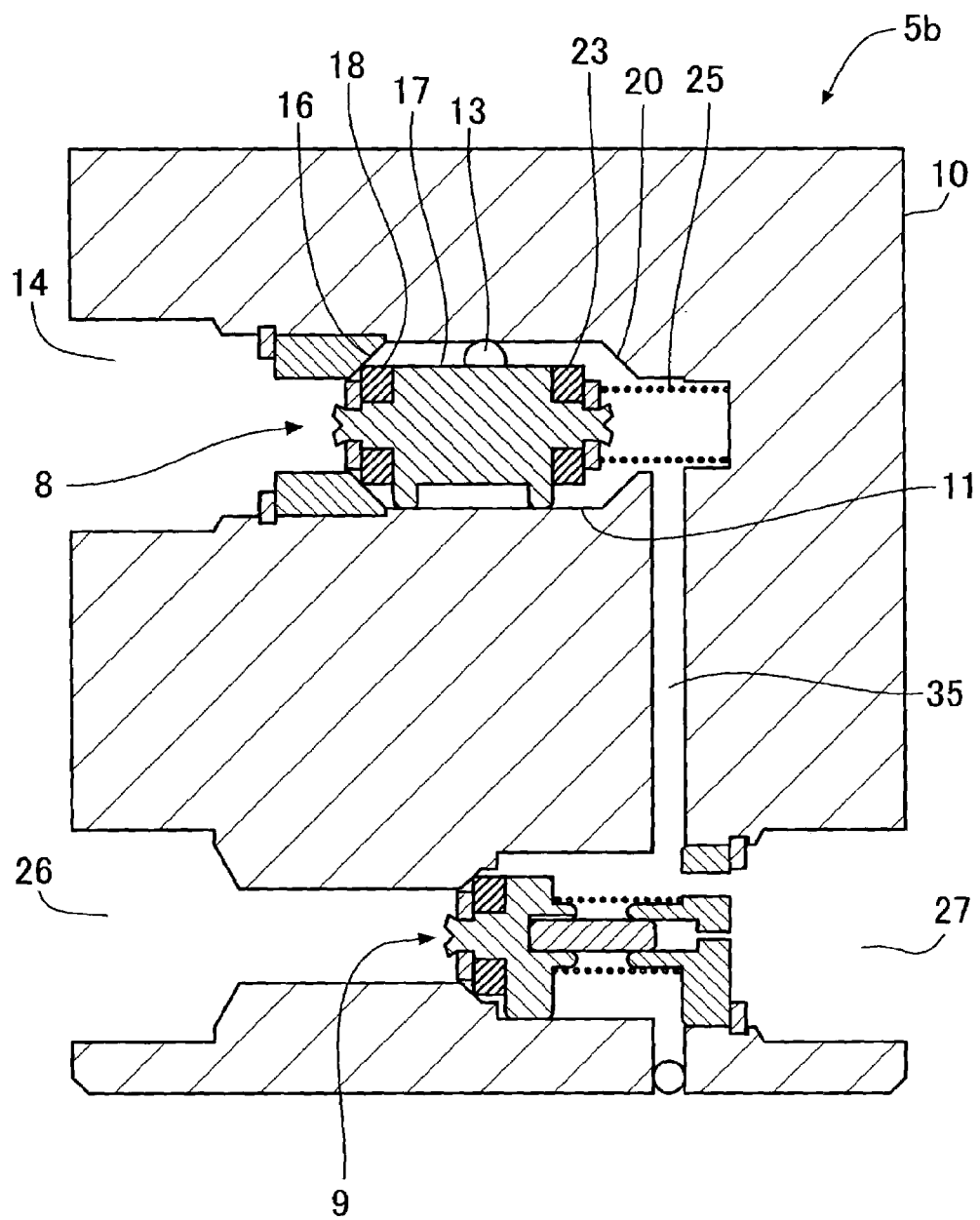
FIG. 6 is a horizontal cross-sectional view showing the construction of an outflow prevention device according to a third embodiment, in a valve-closed state.
Figure 7:
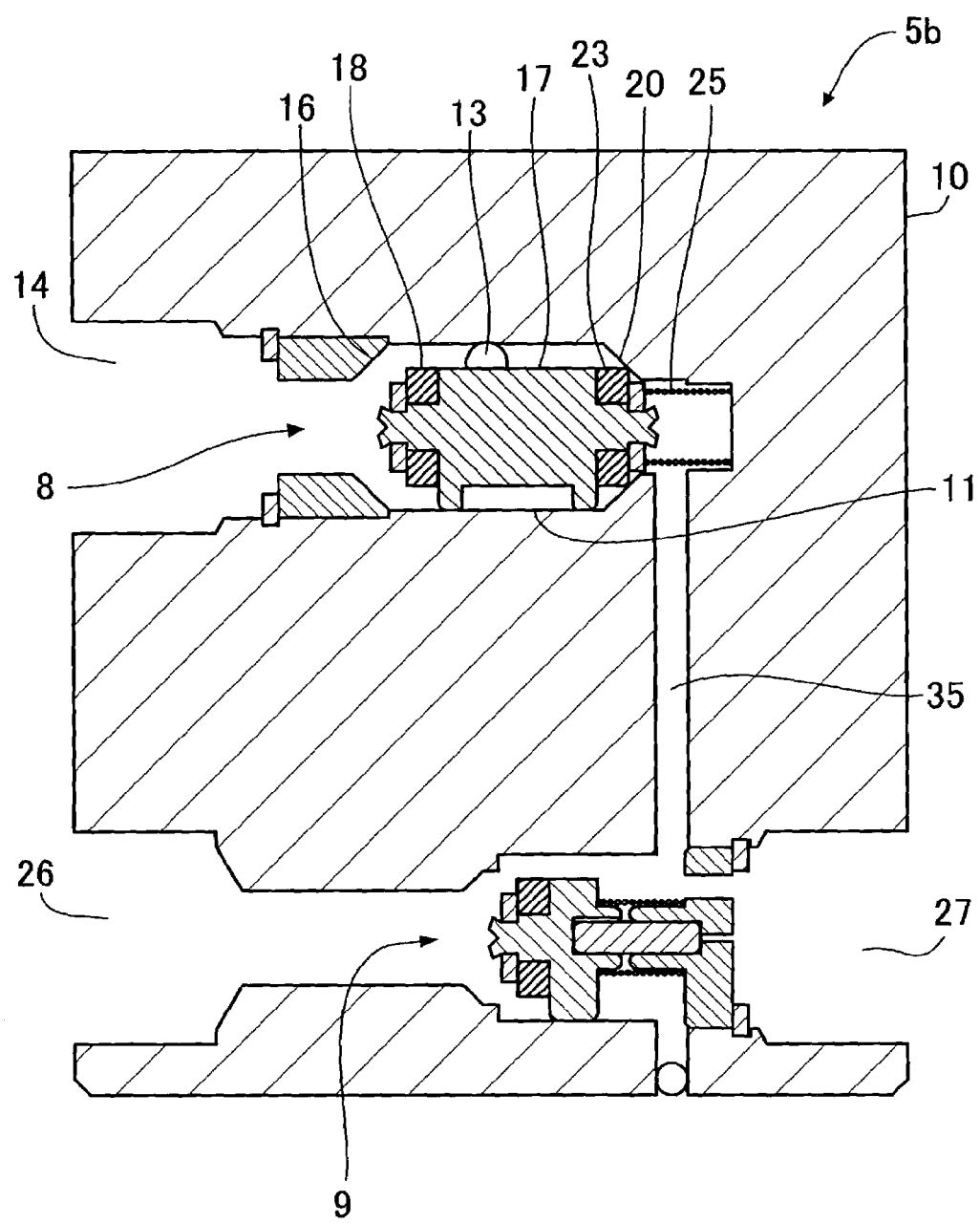
FIG. 7 is a horizontal cross-sectional view showing the construction of the outflow prevention device according to the third embodiment, in a valve-open state.

FIG. 6 is a horizontal cross-sectional view showing an outflow prevention device according to a third embodiment in its valve-closed state, while FIG. 7 is a horizontal cross-sectional view showing the same in its valve-open state. In FIGS. 6 and 7, component parts and elements similar or equivalent to those shown in FIGS. 4 and 5 are designated by identical reference numerals, and detailed description thereof is omitted.

The outflow prevention device 5b of the third embodiment is distinguished from the outflow prevention devices 5, 5a of the first and second embodiments in that a shut valve 8 is constructed as a simple three-way valve having no piston. More specifically, the shut valve 8 is comprised of a plug 17 slidably arranged in a chamber which is defined within an upper passage 11 bored in a body 10 and into which opens an open shut valve inlet 13, valve sheets 18, 23 fixed to the both ends of the plug 17 in the sliding direction, a member fitted in the upper passage 11 in a manner opposed to the valve sheet 18 to form a valve seat 16, and a valve seat 20 integrally formed with the body 10 in a manner opposed to the valve sheet 23. In a chamber downstream of the valve seat 20, there is arranged a spring 25 for urging the plug 17 in a direction causing the valve sheet 18 to be seated on the valve seat 16. The valve sheets 18, 23 have the same diameter so as to prevent the opening/closing operations of the shut valve 8 from being influenced by the pressure of refrigerant introduced via the shut valve inlet 13. A check valve 9 is constructed similarly to those of the outflow prevention devices 5, 5a according to the first and second embodiments.

In the outflow prevention device 5b constructed as above, the operation thereof is similar to those of the outflow prevention devices 5, 5a according to the first and second embodiments. More specifically, the evaporator 6 side of the shut valve 8 and that of the check valve 9 are held in the same pressure state via the evaporator 6, while the opposite sides of the respective valves to the evaporator 6 sides are held in the same pressure state via a bypass passage 35.

Whenever the compressor 1 is started, the pressure on the downstream side of the check valve 9 and the pressure within the chamber of the shut valve 8 in communication with the bypass passage 35 become low, so that the check valve 9 is opened to allow refrigerant to start flowing through the check valve 9, and simultaneously therewith, the shut valve 8 moves rightward, as viewed in the figure, whereby the valve sheet 23 is seated on the valve seat 20 as shown in FIG. 7. On the other hand, if refrigerant flows out into the vehicle compartment due to breakage of the evaporator 6, the pressure on the upstream side of the check valve 9 becomes lower than the pressure on the downstream side of the same, causing the check valve 9 to be closed. The resulting differential pressure across the check valve 9 causes the shut valve 8 to close as shown in FIG. 6, whereby refrigerant is prevented from flowing out from the evaporator 6.

Figure 8:
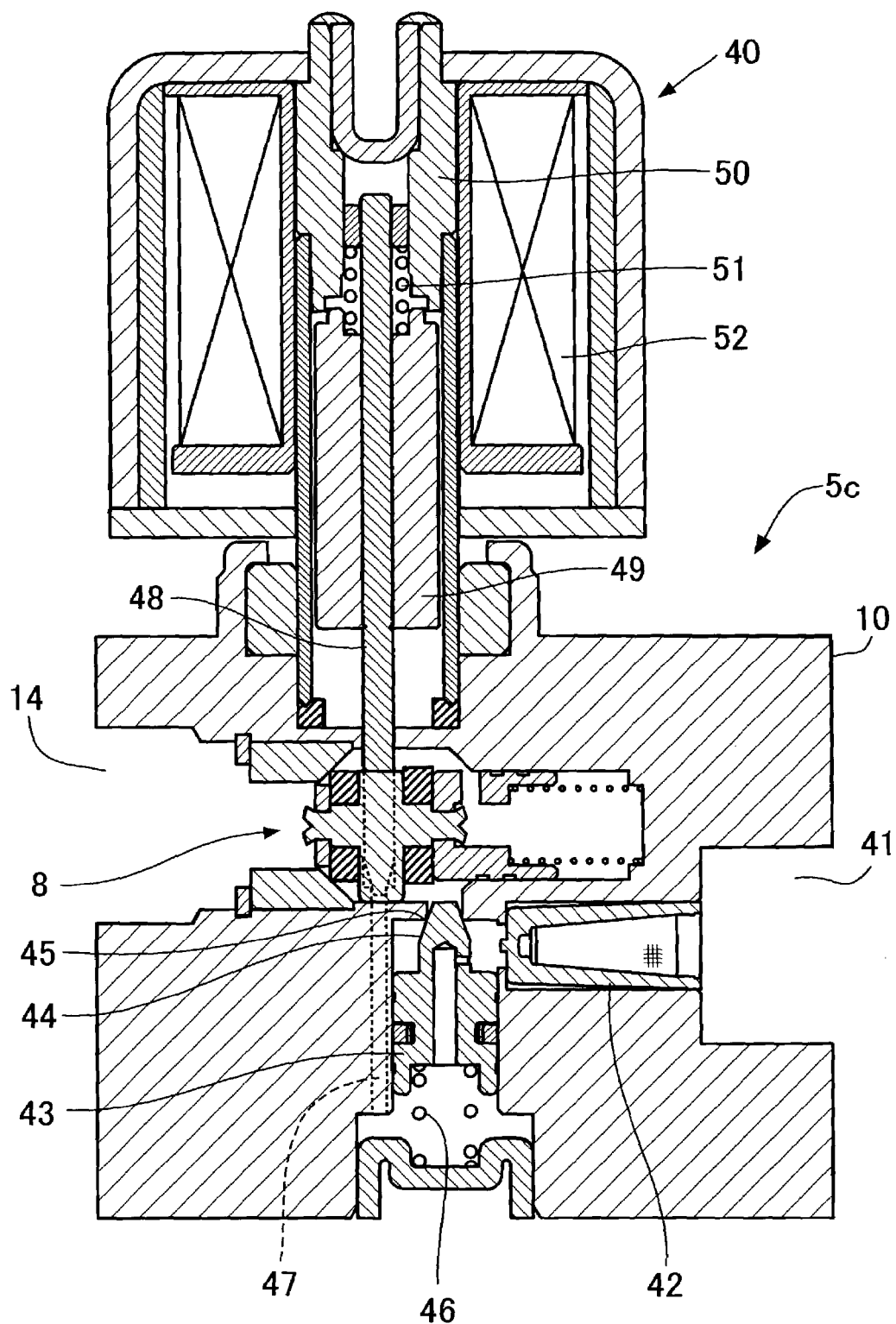
FIG. 8 is a longitudinal cross-sectional view showing the construction of an outflow prevention device according to a fourth embodiment, in a valve-closed state.

FIG. 8 is a longitudinal cross-sectional view showing an outflow prevention device according to a fourth embodiment in its valve-closed state. In FIG. 8, component parts and elements similar or equivalent to those shown in FIGS. 4 and 5 are designated by identical reference numerals, and detailed description thereof is omitted.

The outflow prevention device 5c according to the fourth embodiment is a unitary assembly formed by combining the outflow prevention device 5a according to the second embodiment and the expansion device. In the figure showing the expansion device-integrated outflow prevention device 5c, however, a check valve 9 is not shown due to the position of a line on which the cross-sectional view is taken. In the illustrated example, the check valve 9 is arranged at a location vertically upward of the sheet surface on which the figure is drawn.

In the expansion device-integrated outflow prevention device 5c, a main valve for performing expanding operation of the expansion device 4 and a pilot valve for controlling the valve lift of the main valve are incorporated in a body 10, and a solenoid 40 for controlling the valve lift of the pilot valve is arranged above the body 10.

The body 10 is formed with an expansion device inlet 41 in communication with the upstream side of the main valve via a strainer 42. The main valve is comprised of a main valve element 44 integrally formed with the piston 43 and a main valve seat 45 integrally formed with the body 10. The main valve is urged by a spring 46 in the valve-closing direction. The piston 43 is formed with a restricted passage for communication with respective chambers before and behind the piston 43. Refrigerant supplied to the upstream side of the main valve is allowed to leak in a minute amount into a chamber downward, as viewed in the figure, of the piston 43 via the restricted passage.

The chamber downward of the piston 43 is in communication with a chamber downstream of the main valve, i.e. a chamber in which a shut valve 8 is received, via a pilot passage 47, and an open end of the pilot passage 47 forms a pilot valve seat. A pilot valve element is arranged in a manner opposed to the pilot valve seat from above, as viewed in the figure. The pilot valve element is integrally formed with a shaft 48 of the solenoid 40. A plunger 49 is fixed to the shaft 48 and urged by a spring 51 in a direction away from a core 50, i.e. in the direction causing the pilot valve to be closed. A solenoid coil 52 is wound around the plunger 49 and the core 50.

In the expansion device-integrated outflow prevention device 5c, when the solenoid coil 52 is not energized, and no refrigerant is introduced into the expansion device inlet 41, the main valve is in a state closed by the spring 46. The pilot valve element is also in a state closed by the spring 51 contained in the solenoid 40.

When a high-pressure refrigerant is introduced into the expansion device inlet 41 in this state, the refrigerant is introduced into the chamber above the piston 43 via the strainer 42. The refrigerant is introduced into the chamber below the piston 43 via the restricted passage in the piston 43, and further supplied to the pilot valve via the pilot passage 47 formed in the body 10. When differential pressure across the pilot valve exceeds a value determined by a load of the spring 51 of the solenoid 40, the refrigerant pushes the pilot valve element open and flows into the chamber in which the shut valve 8 is received. As a result, the pressure in the chamber below the piston 43 becomes low, and hence the piston 43 moves downward, as viewed in the figure, whereby the main valve element 44 moves away from the main valve seat 45 to open the main valve. Consequently, the refrigerant introduced into the expansion device inlet 41 is allowed to pass through the main valve and flow out into the chamber in which the shut valve 8 is received. The refrigerant is adiabatically expanded while passing through the main valve, to become a low-temperature and low-pressure refrigerant. At this time, refrigerant from the evaporator 6 is flowing through the check valve 9 due to suction of the compressor 1, and differential pressure generated across the check valve 9 by the flow of the refrigerant holds the shut valve open, so that the refrigerant supplied via the main valve passes through the shut valve 8 and flows into the evaporator 6.

When the refrigerant pressure on the upstream side of the main valve is lowered due to outflow of refrigerant into the chamber in which the shut valve 8 is received, the pressure of the refrigerant supplied to the pilot valve is also reduced, so that the pilot valve element moves in the valve-closing direction. This increases the pressure of the refrigerant introduced into the chamber below the piston 43, so that the piston 43 moves upward, as viewed in the figure, whereby the main valve element 44 is urged in the valve-closing direction. Consequently, the main valve restricts the flow rate of refrigerant to increase the refrigerant pressure on the upstream side of the main valve. The operations described above are repeatedly carried out, whereby the differential pressure across the main valve is controlled to a constant level.

On the other hand, when the solenoid coil 52 is energized, the plunger 49 is attracted toward the core 50, whereby the resilient force of the spring 51 urging the pilot valve element in the valve-closing direction decreases to reduce the differential pressure set to the pilot valve. When the value of current energizing the solenoid coil 52 is increased, the force of attracting the plunger 49 to the core 50 increases, which makes it possible to set the differential pressure of the pilot valve, i.e. the differential pressure across the differential pressure regulating valve to a further smaller value.

When the pressure on the evaporator 6 side of the expansion device-integrated outflow prevention device 5c becomes abnormally low due to rupture of the evaporator 6, the check valve 9 senses the decrease in the pressure and closes. The resulting differential pressure across the check valve 9 causes the shut valve 8 to close to thereby prevent refrigerant from flowing out from the evaporator 6.

Figure 9:
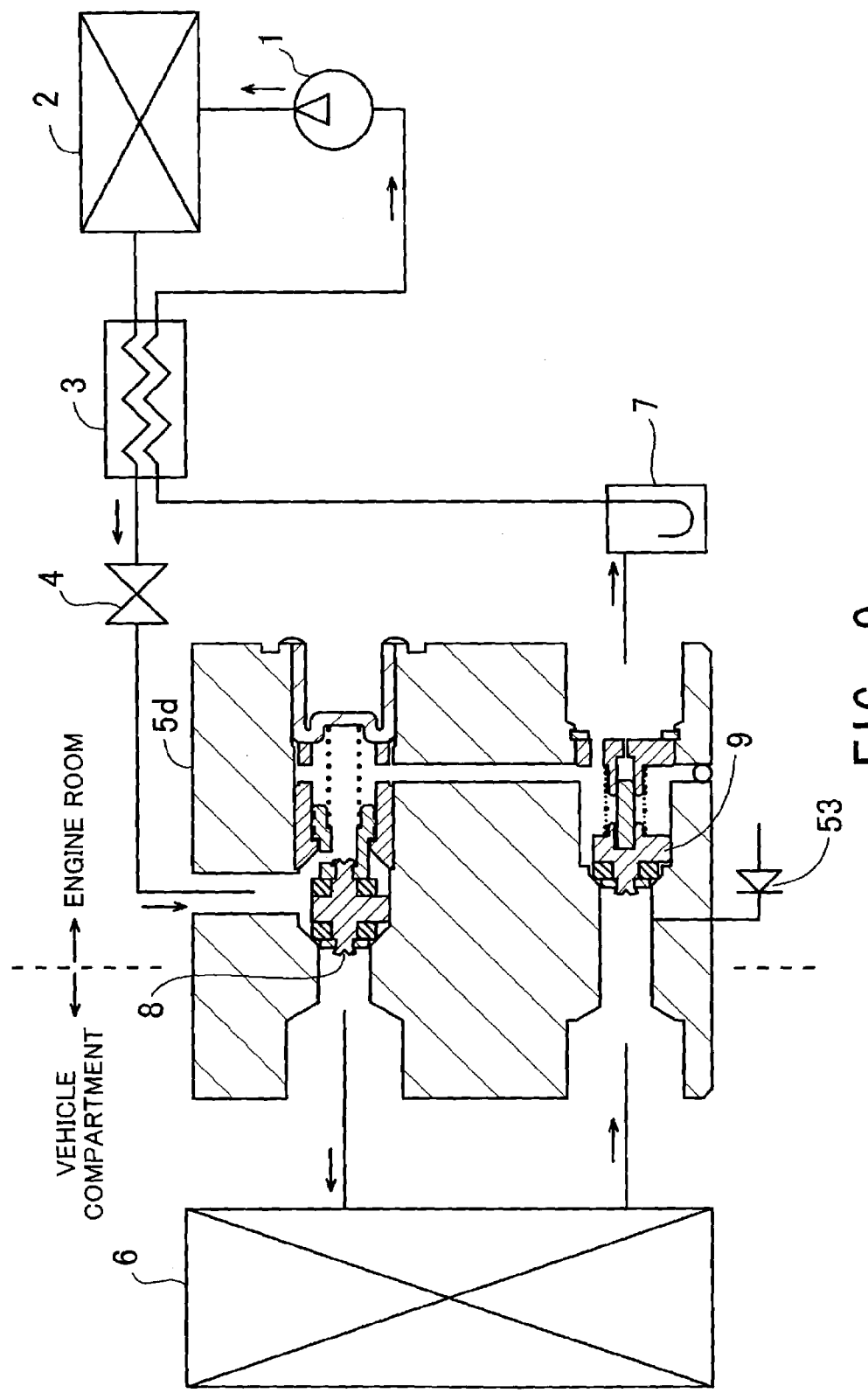
FIG. 9 is a system diagram showing a refrigeration cycle to which is applied an outflow prevention device according to a fifth embodiment.

FIG. 9 is a system diagram showing a refrigeration cycle to which is applied an outflow prevention device according to a fifth embodiment.

The outflow prevention device 5d according to the fifth embodiment has a charge valve 53 arranged at a location upstream of a check valve 9. The charge valve 53 is used for charging the system with refrigerant. After the outflow prevention device is integrated into the system, or when the amount of refrigerant within the system becomes short, refrigerant is charged into the system via the charge valve 53.

Conventionally, such a valve used for charging refrigerant is generally provided in the accumulator 7. However, when the outflow prevention device 5d is integrated into the system, if the valve for charging refrigerant is arranged not in the outflow prevention device 5d but in the accumulator 7, pressure becomes high on the downstream side of a check valve 9 during charging of refrigerant. As a result, the check valve 9 is closed, and a shut valve 8 is also closed in a manner interlocked therewith, which makes it impossible to fill the evaporator 6 with refrigerant.

To solve this problem, in the outflow prevention device 5d, the charge valve 53 is arranged upstream of the check valve 9. Consequently, when refrigerant is charged via the charge valve 53, the charged refrigerant pushes the check valve 9 open to flow toward the accumulator 7. Since the shut valve 8 is opened simultaneously therewith, the charged refrigerant also flows toward the high-pressure side of the outflow prevention device 5d, whereby the whole system is filled with refrigerant.

It should be noted that although in the present embodiment, the charge valve 53 is arranged upstream of the check valve 9, it may be arranged downstream of the shut valve 8.

As described above, according to the present invention, the outflow prevention device includes a check valve and a shut valve which opens and closes in a manner interlocked with the opening/closing operations of the check valve. As a result, when the evaporator is broken, the pressure relationship across the check valve is reversed, whereby the check valve is fully closed, and the shut valve is also fully closed therewith in a manner interlocked therewith. This makes it possible to prevent refrigerant (carbon dioxide) from flowing out from the evaporator into the vehicle compartment.

Further, since the shut valve operates in accordance with differential pressure generated spontaneously by a flow of refrigerant through the check valve, it is unnecessary to control the shut valve by an electric signal from the outside.

Since the pressure-receiving area of the shut valve in the normal valve closed state and the piston area are set to be equal to each other, the shut valve is allowed to perform opening/closing operations simply depending on differential pressure across the check valve, without being influenced by pressure from the high-pressure side.

Since the piston of the shut valve is formed with the communication passage for communicating between the chambers before and behind the piston, even when the compressor is operated when the evaporator is broken, it is possible to deliver refrigerant in a manner bypassing the evaporator, so that abnormal rise in high pressure can be prevented.

By constructing the shut valve as a three-way valve, the valve structure can be simplified, which contributes to reduction of manufacturing costs.

Further, by combining the outflow prevention device with the expansion device to form a unitary assembly, it is possible to make the component parts compact in size to thereby improve mountability on a vehicle.

Moreover, by forming the charge valve for charging of refrigerant integrally on a downstream side of the shut valve or on an upstream side of the check valve, it is possible to fill the evaporator as well with refrigerant when charging refrigerant.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An outflow prevention device for preventing outflow of fluid flowing through a heat exchanger due to breakage of the heat exchanger,
    characterized by comprising:
    a check valve arranged on a fluid outlet side of the heat exchanger, for allowing the fluid to flow only in a direction in which the fluid flows out from the heat exchanger, and
    a shut valve arranged on a fluid inlet side of the heat exchanger, for opening and closing in a manner interlocked with opening and closing operations of said check valve, to thereby control flow of the fluid flowing into the heat exchanger,
    wherein said shut valve has a valve seat formed in an intermediate portion of a passage via which introduced fluid is guided out, a valve element arranged in a manner opposed to said valve seat from an upstream side such that said valve element can move to and away from said valve seat, and a piston fixed to said valve element, and wherein a chamber on an opposite side of said piston to said valve element and a chamber on a downstream side of said check valve are communicated with each other whereby pressures before and behind said check valve are applied to said valve element and said piston, respectively.

2. The outflow prevention device according to claim 1, wherein said valve element has the same diameter as a diameter of said piston.

3. The outflow prevention device according to claim 1, wherein said valve element is formed by a sealing member of a pliant material.

4. The outflow prevention device according to claim 1, wherein a valve-opening differential pressure set point at which said shut valve starts to open is set to be equal to or lower than a valve-opening differential pressure set point for said check valve.

5. The outflow prevention device according to claim 1, wherein said piston has a communication passage for communicating chambers before and behind said piston with each other.

6. The outflow prevention device according to claim 5, comprising a second valve element for closing said communication passage when said shut valve is open.

7. The outflow prevention device according to claim 6, wherein said second valve element is formed by a sealing member of a pliant material.

8. An outflow prevention device for preventing outflow of fluid flowing through a heat exchanger due to breakage of the heat exchanger,
characterized by comprising:
a check valve arranged on a fluid outlet side of the heat exchanger, for allowing the fluid to flow only in a direction in which the fluid flows out from the heat exchanger, and
a shut valve arranged on a fluid inlet side of the heat exchanger, for opening and closing in a manner interlocked with opening and closing operations of said check valve, to thereby control flow of the fluid flowing into the heat exchanger,
wherein said shut valve has a first valve seat formed in an intermediate portion of a passage via which introduced fluid is guided out, a first valve element arranged in a manner opposed to said first valve seat from an upstream side such that said first valve element can move to and away from said first valve seat, a second valve seat formed between a chamber into which fluid is introduced and a chamber communicating with a chamber on a downstream side of said check valve, and a second valve element arranged in a manner opposed to said second valve seat from an upstream side such that said second valve element can move, in unison with said first valve element, to and away from said second valve seat, and wherein pressures before and behind said check valve are applied to said first and second valve elements, respectively.

9. The outflow prevention device according to claim 8, wherein said first and second valve elements have the same diameter.

10. The outflow prevention device according to claim 8, wherein said first and second valve elements are each formed by a sealing member of a pliant material.

11. The outflow prevention device according to claim 8, wherein a valve-opening differential pressure set point at which said shut valve starts to open is set to be equal to or smaller than a valve-opening differential pressure set point for said check valve.

12. An outflow prevention device for preventing outflow of fluid flowing through a heat exchanger due to breakage of the heat exchanger,
characterized by comprising:
a check valve arranged on a fluid outlet side of the heat exchanger, for allowing the fluid to flow only in a direction in which the fluid flows out from the heat exchanger, and
a shut valve arranged on a fluid inlet side of the heat exchanger, for opening and closing in a manner interlocked with opening and closing operations of said check valve, to thereby control flow of the fluid flowing into the heat exchanger,
wherein an expansion device for throttling and expanding liquid is integrally formed therewith.

13. An outflow prevention device for preventing outflow of fluid flowing through a heat exchanger due to breakage of the heat exchanger,
characterized by comprising:
a check valve arranged on a fluid outlet side of the heat exchanger, for allowing the fluid to flow only in a direction in which the fluid flows out from the heat exchanger, and
a shut valve arranged on a fluid inlet side of the heat exchanger, for opening and closing in a manner interlocked with opening and closing operations of said check valve, to thereby control flow of the fluid flowing into the heat exchanger,
wherein a charge valve for charging fluid is integrally formed with the outflow prevention device on a downstream side of said shut valve or on an upstream side of said check valve.

* * * * *